US012726732B2

(12) United States Patent
Sawada et al.

(10) Patent No.: US 12,726,732 B2
(45) Date of Patent: Sep. 1, 2026

(54) IMAGING DEVICE WITH IMAGE ENCRYPTION

(71) Applicant: SK hynix Inc., Icheon-si (KR)

(72) Inventors: Ken Sawada, Tokyo (JP); Daisuke Shiraishi, Tokyo (JP); Sung Kyu Lee, Tokyo (JP)

(73) Assignee: SK HYNIX INC., Icheon-si (KR)

( * ) Notice: Subject to any disclaimer, the term of this patent is extended or adjusted under 35 U.S.C. 154(b) by 34 days.

(21) Appl. No.: 18/907,238

(22) Filed: Oct. 4, 2024

(65) Prior Publication Data

US 2025/0119658 A1 Apr. 10, 2025

(30) Foreign Application Priority Data

Oct. 5, 2023 (KR) ........................ 10-2023-0132589

(51) Int. Cl.
*H04N 25/67* (2023.01)
*G06T 5/70* (2024.01)
(Continued)

(52) U.S. Cl.
CPC ............... *H04N 25/67* (2023.01); *G06T 5/70* (2024.01); *G06T 7/90* (2017.01); *H04L 9/3278* (2013.01);
(Continued)

(58) Field of Classification Search
CPC ...... H04N 25/60; H04N 25/618; H04N 25/67; H04N 25/10; H04N 25/11; H04N 25/13;
(Continued)

(56) References Cited

U.S. PATENT DOCUMENTS 8,514,298 B2 * 8/2013 Ordoubadian ....... H04N 1/2112 348/231.2
11,706,544 B2 * 7/2023 Sawada .................. G06F 21/73 348/308
(Continued)

FOREIGN PATENT DOCUMENTS

JP 2017118229 A 6/2017
JP 2018121111 A 8/2018

OTHER PUBLICATIONS

Title: CamPUF: Physical Unclonable Function based on CMOS Image Sensor Fixed Pattern Noise Authors: Younghyun Kim & Yongwoo Lee; Affiliations: University of Wisconsin, Madison, WI; Published in: 2018 55th ACM/ESDA/IEEE Design Automation Conference (DAC) (Jun. 1, 2018, pp. 1-6) (Year: 2018).*

*Primary Examiner* — Twyler L Haskins
*Assistant Examiner* — Akshay Trehan
(74) *Attorney, Agent, or Firm* — Ashurst Perkins Coie US LLP

(57) ABSTRACT

An imaging device is provided to include a physical unclonable function (PUF) pixel selection unit configured to identify a first pixel that is designated to generate PUF data and select a second pixel having a color identical to a color of the first pixel, a noise extraction unit coupled to the PUF pixel selection unit to receive information of the first pixel and the second pixel and configured to extract a first noise value of the first pixel and a second noise value of the second pixel, and a PUF data generation unit coupled to the noise extraction unit and configured to generate the PUF data based on the first noise value and the second noise value from the noise extraction unit.

20 Claims, 7 Drawing Sheets

(51) Int. Cl.
*G06T 7/90* (2017.01)
*H04L 9/32* (2006.01)
*H04N 1/44* (2006.01)
*H04N 25/11* (2023.01)
*H04N 25/618* (2023.01)

(52) U.S. Cl.
CPC ........... *H04N 25/11* (2023.01); *H04N 25/618* (2023.01); *H04N 1/4486* (2013.01)

(58) Field of Classification Search
CPC ...... H04N 25/134; H04N 23/10; H04N 1/448; H04N 1/4486; H04L 9/3271; H04L 9/3278; G06T 5/70; G06T 7/90
See application file for complete search history.

(56) References Cited

U.S. PATENT DOCUMENTS

| | | | | |
|---|---|---|---|---|
| 2010/0134647 | A1* | 6/2010 | Orboubadian ....... | H04N 1/2112 348/222.1 |
| 2022/0385849 | A1* | 12/2022 | Sawada .................. | H04N 25/67 |

* cited by examiner

400

| R00 | G01 | R02 | G03 | R04 | G05 | R06 | G07 |
|---|---|---|---|---|---|---|---|
| G10 | B11 | G12 | B13 | G14 | B15 | G16 | B17 |
| R20 | G21 | R22 | G23 | R24 | G25 | R26 | G27 |
| G30 | B31 | G32 | B33 | G34 | B35 | G36 | B37 |
| R40 | G41 | R42 | G43 | R44 | G45 | R46 | G47 |
| G50 | B51 | G52 | B53 | G54 | B55 | G56 | B57 |
| R60 | G61 | R62 | G63 | R64 | G65 | R66 | G67 |
| G70 | B71 | G72 | B73 | G74 | B75 | G76 | B77 |

IMAGING DEVICE WITH IMAGE ENCRYPTION

PRIORITY CLAIM AND CROSS-REFERENCES TO RELATED APPLICATION

This patent document claims priority under 35 U.S.C. § 119(a) to Korean application number 10-2023-0132589, filed on Oct. 5, 2023, in the Korean Intellectual Property Office, which is incorporated herein by reference in its entirety.

TECHNICAL FIELD

Various embodiments relate to an imaging device having an encryption function for image data.

BACKGROUND

An imaging device is a device that captures an optical image by using the property of a light detection semiconductor material that reacts to light. With the development of industries such as vehicles, medical treatment, computers, and communications, the demand for high-performance imaging devices is increased in various fields, such as smartphones, digital cameras, gaming devices, Internet of Things, robots, cameras for security, and micro cameras for medical treatment.

The imaging device may be basically divided into a charge-coupled device (CCD) imaging device and a complementary metal oxide semiconductor (CMOS) imaging device. The CCD imaging device provides better image quality than the CMOS imaging device, but tends to consume more power than the CMOS imaging device because the CCD imaging device is implemented to have a larger size than the CMOS imaging device. In contrast, the CMOS imaging device may be embodied to have a smaller size than the CCD imaging device, and consumes less power than the CCD imaging device. Furthermore, the CMOS imaging device may have a light detection element and a signal processing circuit integrated into a single chip because the CMOS imaging device is manufactured by using a CMOS manufacturing technology. Accordingly, a small-sized CMOS imaging device can be produced at a low cost. For this reason, the CMOS imaging device is developed for many applications including mobile devices.

SUMMARY

Various embodiments are directed to providing an imaging device having an encryption function having high stability with respect to the hacking of image data.

The technical effects expected from the disclosed technology are not limited to the above-mentioned effects and other technical effects which are not mentioned herein will be clearly understood by those skilled in the art from the following descriptions.

In an embodiment, an imaging device may include a physical unclonable function (PUF) pixel selection unit configured to identify a first pixel that is designated to generate PUF data and select a second pixel having a color identical to a color of the first pixel, a noise extraction unit coupled to the PUF pixel selection unit to receive information of the first pixel and the second pixel and configured to extract a first noise value of the first pixel and a second noise value of the second pixel, and a PUF data generation unit coupled to the noise extraction unit and configured to generate the PUF data based on the first noise value and the second noise value from the noise extraction unit.

In an embodiment, a method of processing an image signal may include selecting a first pixel in a pixel array of pixels based on challenge data that designate a location of at least one pixel of the pixel array, selecting a second pixel in the pixel array to have a color identical to a color of the first pixel, extracting a noise value of each of the first pixel and the second pixel, and generating response data by comparing the noise value of the first pixel and the noise value of the second pixel.

According to embodiments disclosed in this document, malicious defraudation and unauthorized interpretation with respect to others can be prevented by encrypting image data by using information that is randomly generated in association with unique characteristics within the imaging device in addition to fixed information attributable to the unique characteristics.

In some implementations, it is possible to provide various effects which are directly or indirectly understood through this document.

BRIEF DESCRIPTION OF THE DRAWINGS

FIGS. 4-6 are diagrams for describing an operation according to an embodiment of the PUF data generation unit in a pixel array having several patterns.

DETAILED DESCRIPTION

Hereafter, various embodiments of the present disclosure will be described with reference to the accompanying drawings. However, it should be noted that the present disclosure is not limited to specific embodiments, but includes various modifications, equivalents and/or alternatives. An embodiment of the present disclosure may provide various effects which may be recognized directly and indirectly through the present disclosure.

Figure 1:
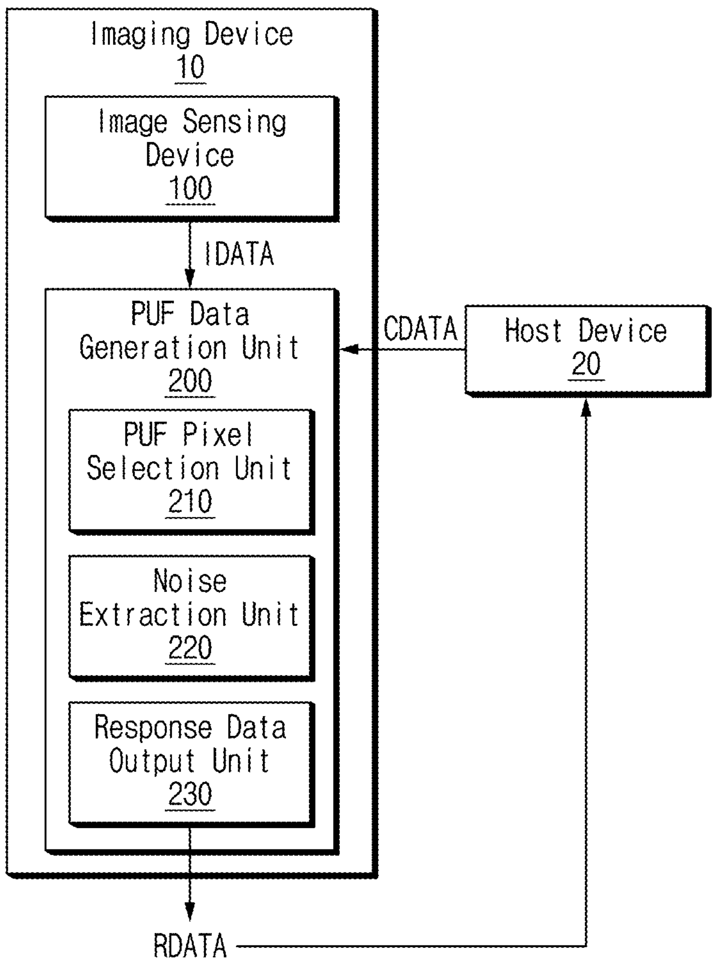
FIG. 1 is a block diagram briefly illustrating an imaging device according to an embodiment of the present disclosure.

FIG. 1 is a block diagram briefly illustrating an imaging device according to an embodiment of the present disclosure.

Referring to FIG. 1, an imaging device 10 may be a device capable of communication with a host device 20 that is an external device located outside the imaging device 10. The imaging device 10 may include an image sensing device 100, a physical unclonable function (PUF) data generation unit 200, a PUF pixel selection unit 210, a noise extraction unit 220, and a response data output unit 230.

The imaging device 10 may include a pixel array of imaging pixels that convert light into pixel signals to generate image data (IDADA) by capturing a scene. The pixel array may include pixel color filters located at the imaging pixels, respectively, to filter the incident light to be received by the imaging pixels to capture color information of the captured scene. The image capturing operation of the imaging device 10 may be triggered or performed in response to a request from the host device 20 or according to a predetermined rule (e.g., a temporal cycle or condition). In the example, the imaging device 10 may receive challenge data CDATA from the host device 20, generate response data RDATA corresponding to the received challenge data CDATA by using a physical unclonable function (PUF) that generates the response data RDATA based on unique characteristics within the imaging device 10 attributable to a delicate difference that occurs in a semiconductor process for fabricating the imaging device 10, and output the response data RDATA to the outside.

In the implementations, the PUF may output a response to a challenge by using the unique characteristics within the imaging device 10. For example, the PUF compare the output response and a comparison response data that has been previously stored, determine whether the output response is identical to the comparison response data, and validate the imaging device based on the determining. In the examples disclosed in this document, the challenge data CDATA corresponds to a challenge provided to the PUF and the response data RDATA corresponds to a response provided from the PUF.

The unique characteristics within the imaging device 10, which are used in the PUF, may include fixed pattern noise (FPN) and random telegraph noise (RTN). For example, PUF data may include information corresponding to at least one piece of FPN and at least one piece of RTN. In an example, the PUF data may further include information corresponding to a threshold voltage value attributable to unique characteristics of a transistor of one pixel. In an example, the PUF data and the response data RDATA may refer to the same data.

The image sensing device 100 may generate image data IDATA by capturing a scene. The generated image data IDATA may include a noise value of a pixel that is unique to the pixel. For example, the unique noise value of the pixel may include FPN attributable to unique characteristics within the imaging device 10 and RTN that is randomly generated in association with the unique characteristics within the imaging device 10. In an example, the unique noise value of the pixel may include a threshold voltage value of at least one transistor corresponding to the pixel. The threshold voltage value refers to a voltage that turns on or off the corresponding transistor of the pixel. For example, the noise value of the pixel may include the FPN, the RTN, and the threshold voltage value based on the characteristics within the imaging device 10.

The image sensing device 100 may output the image data IDATA, including noise values of a pixel including at least one of the FPN, the RTN, or the threshold voltage value that is associated with the characteristics of the imaging device 10 and unique to the pixel. In an example, the image sensing device 100 may output the image data IDATA including at least one of FPN, RTN, or a threshold voltage value of at least one transistor within a pixel, which corresponds to characteristics of the pixel.

In the example, the FPN may be obtained due to a leakage current that is generated within the pixel in a condition in which light is not transmitted to a pixel array (i.e., a dark condition). In the example, the RTN may be or include noise occurring in a drive transistor DX of the pixel, and may be randomly generated or may be obtained from noise occurring in the drive transistor DX of the pixel that senses incident light.

The PUF data generation unit 200 may include the PUF pixel selection unit 210, the noise extraction unit 220, and the response data output unit 230.

The PUF data generation unit 200 may generate the PUF data by receiving the image data IDATA and the challenge data CDATA. In the implementations, the PUF data is generated by the PUF data generation unit 200 and the generated PUF data are output as the response data RDATA.

The PUF pixel selection unit 210 may select pixels that are used to generate the PUF data based on the challenge data CDATA.

In an example, the challenge data CDATA may include information that designates the location of a pixel. For example, the challenge data CDATA may include information indicative of the location of a first column and first row of the pixel array that is included in the imaging device 10. In this case, the PUF pixel selection unit 210 may identify a first pixel that is disposed at the first column and the first row and select a second pixel corresponding to the first pixel.

In an example, when the first pixel is designated by receiving the challenge data CDATA, the PUF pixel selection unit 210 may select the second pixel including a color filter having the same color as the color filter of the first pixel. The PUF pixel selection unit 210 may transmit pixel data of the first pixel and pixel data of the second pixel to the noise extraction unit 220.

The noise extraction unit 220 may extract the noise of each pixel by receiving the pixel data from the PUF pixel selection unit 210.

In an example, the noise extraction unit 220 may extract, from the pixel data received from the PUF pixel selection unit 210, at least one of the FPN, the RTN, or the threshold voltage value of the transistor, which corresponds to the pixel. For example, the noise extraction unit 220 may extract noise data of the first pixel and noise data of the second pixel from the pixel data that has been received from the PUF pixel selection unit 210. In the example, the noise data of the first pixel and the noise data of the second pixel may include at least one of FPN or RTN, which corresponds to characteristics of the pixel. In an example, the noise data may include a threshold voltage value of at least one transistor corresponding to the pixel that is designated or selected by the PUF pixel selection unit 210.

The response data output unit 230 may generate the PUF data based on the noise data extracted from the noise data NDATA, and may output the generated PUF data to the response data RDATA.

In an example, the response data output unit 230 may determine each bit of the PUF data by comparing the noise data of the first pixel and the noise data of the second pixel. In an example, the response data output unit 230 may determine the level of a first bit of the PUF data as a first logic level or a second logic level, based on a result of the comparison between the noise data of the first pixel and the noise data of the second pixel that are selected in accordance with the first pixel. When each bit of the PUF data is determined, the response data output unit 230 may output the determined bits as the response data RDATA.

In the implementation, the PUF data generation unit 200 may receive the challenge data CDATA, may select pixels that are used to generate the PUF data by using the PUF pixel selection unit 210, may extract noise values of the selected pixels by using the noise extraction unit 220, may generate the PUF data based on the extracted noise values by using the response data output unit 230, and may output the generated PUF data as the response data RDATA.

The detailed operations of the PUF data generation unit 200 will be described later with reference to FIG. 3.

Figure 2:
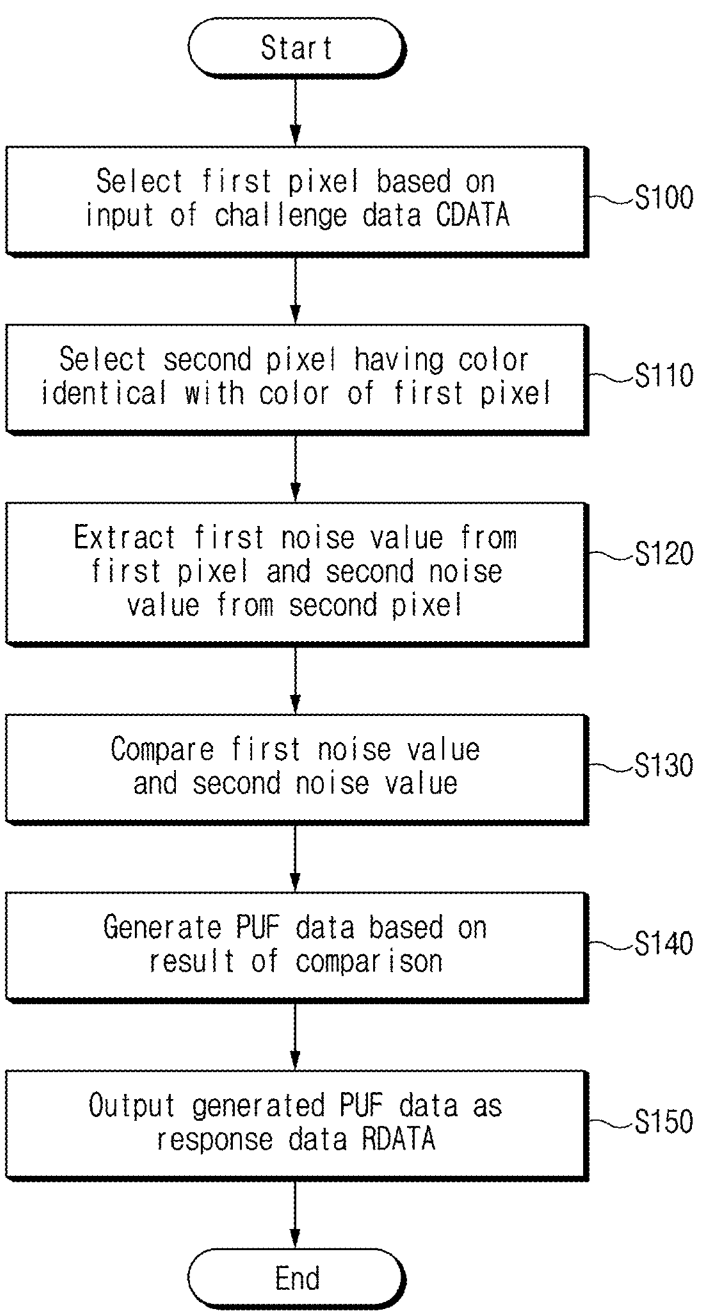
FIG. 2 is a flowchart for describing an operation of the imaging device according to an embodiment of the present disclosure.

FIG. 2 is a flowchart for describing an operation of the imaging device according to an embodiment of the present disclosure.

Referring to FIG. 2, an operation of the PUF data generation unit 200 according to an embodiment may include step S100 of selecting a first pixel based on the challenge data CDATA, step S110 of selecting a second pixel having the same color as the first pixel, step S120 of extracting a first noise value from the first pixel and a second noise value from the second pixel, step S130 of comparing the first noise value and the second noise value, step S140 of generating PUF data based on a result of the comparison, and step S150 of outputting the generated PUF data as the response data RDATA.

The input of the challenge data CDATA may correspond to a challenge input for outputting a response in a common PUF operation.

In an example, the PUF pixel selection unit 210 may select the first pixel based on a pixel address that is designated by the challenge data CDATA (S100). For example, the challenge data CDATA may include data indicative of a first row and first column of the pixel array. In this case, the PUF pixel selection unit 210 may identify the first pixel in response to the challenge data CDATA.

In an example, the challenge data CDATA may include data indicative of pixels disposed in the first row of the pixel array. In this case, the PUF pixel selection unit 210 may identify the pixels disposed in the first row of the pixel array in response to the challenge data CDATA.

In an example, the PUF pixel selection unit 210 may select the second pixel having the same color as the first pixel that has been selected in step S100 (S110). For example, if the first pixel includes a red (R) color filter, the PUF pixel selection unit 210 may select the second pixel including the R color filter.

While FIG. 2 shows the selecting of the first pixel and the second pixel at S100 and S110, the number of pixels selected by the PUF pixel selection unit 210 is not limited to two and can be varied. In an example, the PUF pixel selection unit 210 may select multiple first pixels at S100 and multiple second pixels corresponding to the multiple first pixels at S110. the PUF pixel selection unit 210 may select a plurality of pixels having the same colors as a plurality of pixels, respectively, which have been selected in step S100. For example, if the first pixel including the R color filter and the second pixel including a green (G) color filter are designated in step S100, the PUF pixel selection unit 210 may select a third pixel that includes the R color filter and corresponds to the first pixel and a fourth pixel that includes the G color filter and corresponds to the second pixel. In the description, in this case, a distance between the first pixel and the third pixel may be the same as a distance between the second pixel and the fourth pixel.

In an example, the noise extraction unit 220 may extract the first noise value from the first pixel and the second noise value from the second pixel which has been selected in step S110 (S120). For example, the noise extraction unit 220 may extract, from the pixel data of the first pixel that is included in the image data IDATA, at least one of RTN, FPN, or a noise value including at least one of threshold voltage values of a transistor corresponding to the first pixel. In addition, the noise extraction unit 220 may extract, from the pixel data of the second pixel that is included in the image data IDATA, at least one of RTN, FPN, or a noise value including at least one of threshold voltage values of a transistor corresponding to the second pixel.

In an example, the noise extraction unit 220 may respectively extract the first noise value from the first pixel and the second noise value from the second pixel which has been selected in step S110. In the example, when there are multiple pixels selected in each step of S110 and S120, the noise extraction unit further extract the noise values corresponding to the additional pixels. For example, if there are a third pixel selected in S100 and a fourth pixel selected in S110 which is corresponding to the third pixel, the noise extraction unit 220 may extract a third noise value from the third pixel and the fourth noise value from a fourth pixel.

For example, the noise extraction unit 220 may extract, from the pixel data of the first pixel that is included in the image data IDATA, at least one of RTN, FPN, or a noise value including threshold voltage values of a transistor corresponding to the first pixel. In the example, the noise extraction unit 220 may extract, from the pixel data of the second pixel that is included in the image data IDATA, at least one of RTN, FPN, or a noise value including threshold voltage values of a transistor corresponding to the second pixel. In the example, the noise extraction unit 220 may extract, from the pixel data of the third pixel that is included in the image data IDATA, at least one of RTN, FPN, or a noise value including threshold voltage values of a transistor corresponding to the third pixel. In the example, the noise extraction unit 220 may extract, from the pixel data of the fourth pixel that is included in the image data IDATA, at least one of RTN, FPN, or a noise value including threshold voltage values of a transistor corresponding to the fourth pixel.

In an example, the response data output unit 230 may compare the first noise value and the second noise value that have been extracted in step S120 (S130). For example, the response data output unit 230 may determine a size relation between the first noise value and the second noise value. For example, the response data output unit 230 may compare the sum of the values of the RTN and the FPN, among the noise values of the first pixel, and the sum of the values of the RTN and the FPN, among the noise values of the second pixel.

In an example, the response data output unit 230 may compare the first noise value and the second noise value that have been extracted in step S120, and may compare the third noise value and the fourth noise value that have been extracted in step S120. For example, the response data output unit 230 may determine a size relation between the first noise value and the second noise value, and may determine a size relation between the third noise value and the fourth noise value. For example, the response data output unit 230 may compare the sum of the values of the RTN and the FPN, among the noise values of the first pixel, and the sum of the values of the RTN and the FPN, among the noise values of the second pixel, and may compare the sum of the values of the RTN and the FPN, among the noise values of the third pixel, and the sum of the values of the RTN and the FPN, among the noise values of the fourth pixel.

In an example, the response data output unit 230 may generate the PUF data based on a result of the comparison in step S130 (S140). The generated PUF data may correspond to the response data RDATA. For example, the response data output unit 230 may generate the PUF data and output the generated PUF data as the response data RDATA.

In an example, the response data output unit 230 may determine a first bit of the PUF data by comparing the first noise value and the second noise value. For example, the response data output unit 230 may determine the first bit of the PUF data as 1 when the first noise value is greater than or equal to the second noise value, and may determine the first bit of the PUF data as 0 when the first noise value is smaller than the second noise value.

In an example, the response data output unit 230 may determine the first bit of the PUF data by comparing the first noise value and the second noise value, and may determine a second bit of the PUF data by comparing the third noise value and the fourth noise value. For example, the response data output unit 230 may determine the first bit of the PUF data as 1 when the first noise value is greater than or equal to the second noise value, and may determine the first bit of the PUF data as 0 when the first noise value is smaller than the second noise value. In the example, the response data output unit 230 may determine the second bit of the PUF data as 1 when the third noise value is greater than or equal to the fourth noise value, and may determine the second bit of the PUF data as 0 when the third noise value is smaller than the fourth noise value.

In an example, the response data output unit 230 may output, as the response data RDATA, the PUF data that have been generated in step S140 (S150). In this case, the output response data RDATA may be transmitted to the host device 20. For example, when the first bit of the PUF data is determined as 0, the response data output unit 230 may output the response data RDATA having the first bit of 0. For example, when the first bit and second bit of the PUF data are determined as 1 and 0, respectively, the response data output unit 230 may output the response data RDATA having the first bit and second bit of 1 and 0, respectively.

Figure 3:
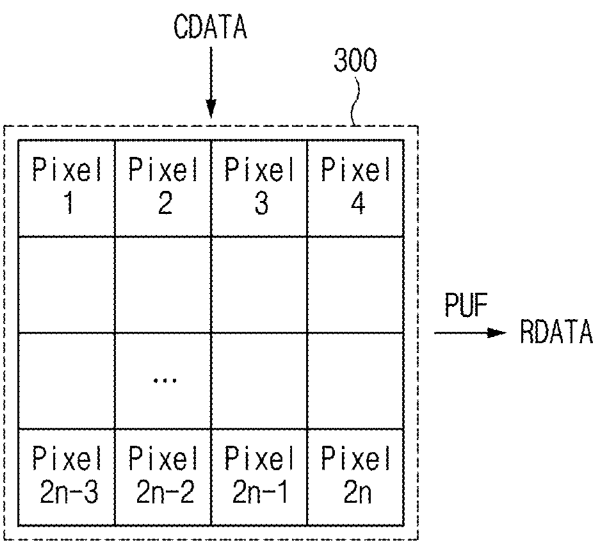
FIG. 3 is a diagram for describing an operation according to an embodiment of a PUF data generation unit illustrated in FIG. 1.

FIG. 3 is a diagram for describing an operation according to an embodiment of the PUF data generation unit illustrated in FIG. 1.

Referring to FIG. 3, the imaging device 10 may receive the challenge data CDATA and output the response data RDATA based on the PUF of the imaging device 10.

In an example, the challenge data CDATA may include information that identifies the location of a pixel included in the imaging device 10. For example, the challenge data CDATA may include information that designates a first row and first column of a pixel array 300. In this case, a first pixel Pixel1 disposed at the first row and the first column may be designated in accordance with the challenge data CDATA. When the first pixel Pixel1 is designated, the PUF pixel selection unit 210 may select a third pixel Pixel3 including a color filter having the same color as the color filter of the first pixel Pixel1. For example, the first pixel Pixel1 and the third pixel Pixel3 may correspond to the R color filter. The noise extraction unit 220 may extract the noise data of the first pixel Pixel1 and the noise data of the third pixel Pixel3. The response data output unit 230 may generate each bit of PUF data by comparing the noise data of the first pixel Pixel1 and the noise data of the third pixel Pixel3, and may output the generated PUF data as the response data RDATA.

For example, the response data output unit 230 may output a first bit of the response data RDATA as 1 when the noise data of the first pixel Pixel1 is greater than or equal to the noise data of the third pixel Pixel3, and may output the first bit of the response data RDATA as 0 when the noise data of the first pixel Pixel1 is smaller than the noise data of the third pixel Pixel3.

In an example, the challenge data CDATA may include information that designates multiple pixels, e.g., the first row and first column, and first row and second column of the pixel array 300. In this case, the first pixel Pixel1 disposed at the first row and first column of the pixel array 300 may be designated in accordance with the information indicating the first row and the first column. A second pixel Pixel2 disposed at the first row and second column of the pixel array 300 may be designated in accordance with the information indicating the first row and the second column. When the first pixel Pixel1 and the second pixel Pixel2 are designated, the PUF pixel selection unit 210 may select the third pixel Pixel3 including the color filter having the same color as the color filter of the first pixel Pixel1 and a fourth pixel Pixel4 including a color filter having the same color as the color filter of the second pixel Pixel2. For example, the first pixel Pixel1 and the third pixel Pixel3 may correspond to the R color filter, and the second pixel Pixel2 and the fourth pixel Pixel4 may correspond to a green (G) color filter. The noise extraction unit 220 may extract the noise data of the first pixel Pixel1 and the noise data of the third pixel Pixel3, and may extract the noise data of the second pixel Pixel2 and the noise data of the fourth pixel Pixel4. The response data output unit 230 may determine each bit of the PUF data by comparing the noise data of the first pixel Pixel1 and the noise data of the third pixel Pixel3 and comparing the noise data of the second pixel Pixel2 and the noise data of the fourth pixel Pixel4, and may output, as the response data RDATA, the PUF data having each bit determined.

For example, the response data output unit 230 may determine the first bit of the PUF data as 1 when the noise data of the first pixel Pixel1 is greater than or equal to the noise data of the third pixel Pixel3, and may determine the first bit of the PUF data as 0 when the noise data of the first pixel Pixel1 is smaller than the noise data of the third pixel Pixel3. The response data output unit 230 may determine a second bit of the PUF data as 1 when the noise data of the second pixel Pixel2 is greater than or equal to the noise data of the fourth pixel Pixel4, and may determine the second bit of the PUF data as 0 when the noise data of the second pixel Pixel2 is smaller than the noise data of the fourth pixel Pixel4. The response data output unit 230 may output, as the response data RDATA, PUF data having each bit determined.

Figure 5:
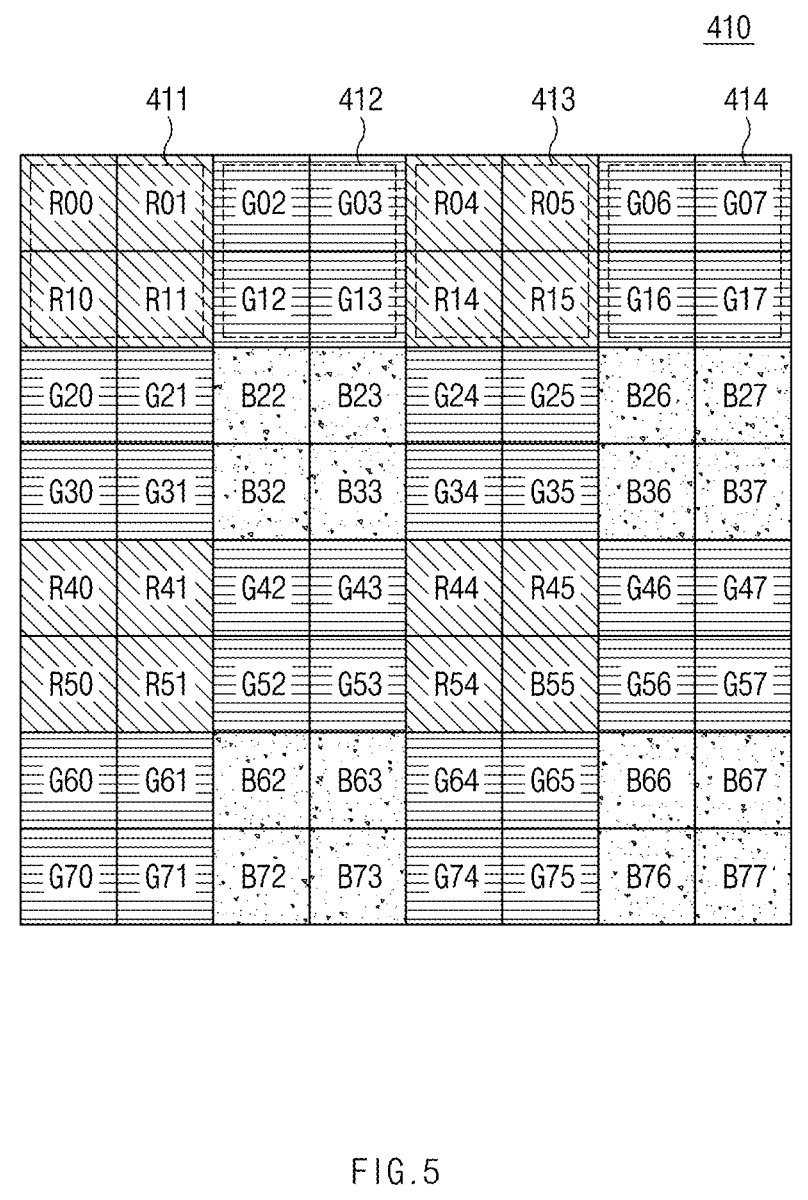
Figure 6:
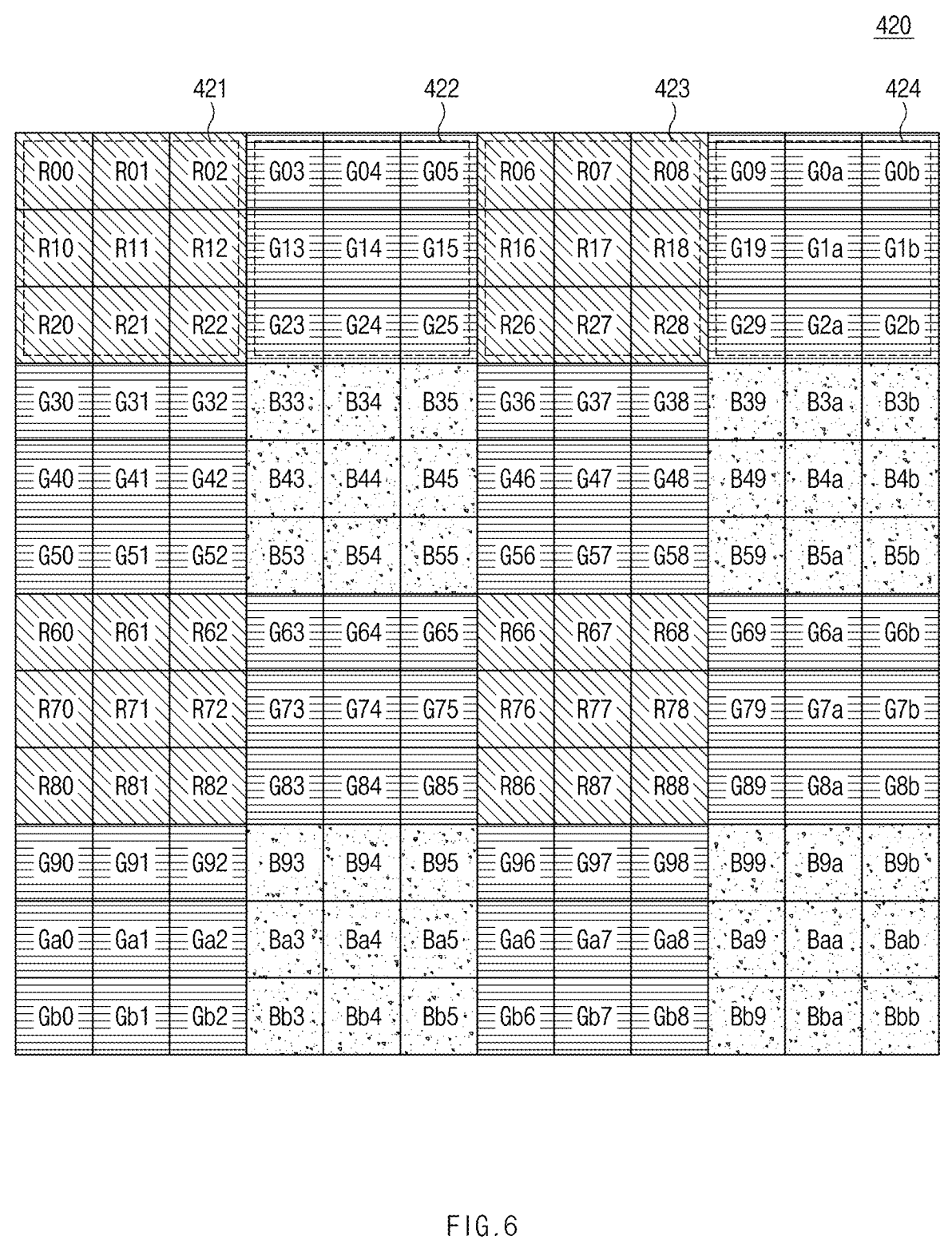

FIGS. 4-6 are diagrams for describing an operation according to an embodiment of the PUF data generation unit in a pixel array having several patterns.

Referring to FIG. 4, the imaging device 10 may generate PUF data in a pixel array 400 including a bayer pattern. The pixel array 400 includes red, green, and blue filters that are arranged in a specific repeating pattern (e.g., RGGB). In the pixel array with the bayer pattern, there are twice as many green filters compared to red filters and blue filters. In an example, the PUF data generation unit 200 may output the response data RDATA by receiving the image data IDATA and the challenge data CDATA. In this case, the challenge data CDATA may include information that designates the location of at least one of pixels included in the pixel array 400 including the bayer pattern. The PUF data generation unit 200 may select a pixel designated based on the challenge data CDATA and a pixel corresponding to the designated pixel through the PUF pixel selection unit 210, may extract noise values of the designated pixel and the selected pixel through the noise extraction unit 220, and may generate PUF data by comparing the extracted noise values and output the generated PUF data as the response data RDATA through the response data output unit 230.

For example, the challenge data CDATA may include information that designates a first row and first column of the pixel array 400 including the bayer pattern. In this case, a pixel R00 disposed at the first row and the first column may be designated based on the challenge data CDATA. When the pixel R00 is designated, the PUF pixel selection unit 210 may select a pixel R02 including a color filter having the same color as the color filter of the pixel R00. The noise extraction unit 220 may extract the noise data of the pixel R00 and the noise data of the pixel R02. The response data output unit 230 may generate each bit of PUF data by comparing the noise data of the pixel R00 and the noise data of the pixel R02. The response data output unit 230 may determine a first bit of the PUF data as 1 when the noise data of the pixel R00 are greater than or equal to the noise data of the pixel R02, and may determine the first bit of the PUF data as 0 when the noise data of the pixel R00 are smaller than the noise data of the pixel R02. When each bit of the PUF data is determined, the response data output unit 230 may output the PUF data as the response data RDATA.

For example, the challenge data CDATA may include information that designates the first row and first column, and first row and second column of the pixel array 400 including the bayer pattern. In this case, the pixel R00 disposed at the first row and the first column may be designated and a pixel G01 disposed at the first row and the second column may be designated, in accordance with the challenge data CDATA. When the pixel R00 and the pixel G01 are designated, the PUF pixel selection unit 210 may select a pixel R04 including a color filter having the same color as the color filter of the pixel R00 and a pixel G05 including a color filter having the same color as the color filter of the pixel G01. The noise extraction unit 220 may extract the noise data of the pixel R00 and the noise data of the pixel R04, and may extract the noise data of the pixel G01 and the noise data of the pixel G05. The response data output unit 230 may determine the first bit of the PUF data as 1 when the noise data of the pixel R00 are greater than or equal to the noise data of the pixel R04, and may determine the first bit of the PUF data as 0 when the noise data of the pixel R00 are smaller than the noise data of the pixel R04. Likewise, the response data output unit 230 may determine a second bit of the PUF data as 1 when the noise data of the pixel G01 are greater than or equal to the noise data of the pixel G05, and may determine the second bit of the PUF data as 0 when the noise data of the pixel G01 are smaller than the noise data of the pixel G05. When each bit of the PUF data is determined, the response data output unit 230 may output the PUF data as the response data RDATA.

Referring to FIG. 5, the imaging device 10 may generate PUF data in a pixel array 410 including a quad pattern. The quad pattern groups the red, green, blue filters into 2×2 matrices, each pixel group including a set of pixels having the same color filter and being arrayed in a 2×2 matrix form. For example, the pixel array 410 includes a first pixel group 411 corresponding to the red filters, a second pixel group 412 corresponding to the green filters, a third pixel group 413 corresponding to the red filters, a fourth pixel group 414 corresponding to the green filters, each pixel group having pixels arranged in two columns and two rows.

In an example, the PUF data generation unit 200 may output the response data RDATA by receiving the image data IDATA and the challenge data CDATA. In this case, the challenge data CDATA may include information that designates the location of at least one of pixels included in the pixel array 410 including the quad pattern. The PUF data generation unit 200 may select a pixel designated based on the challenge data CDATA and a pixel corresponding to the designated pixel through the PUF pixel selection unit 210, may extract noise values of the designated pixel and the selected pixel through the noise extraction unit 220, and may generate PUF data by comparing the extracted noise values and output the generated PUF data as the response data RDATA through the response data output unit 230.

For example, the challenge data CDATA may include information that designates a first row and first column of the pixel array 410 including the quad pattern. In this case, a pixel R00 disposed at the first row and the first column may be designated based on the challenge data CDATA. When the pixel R00 is designated, the PUF pixel selection unit 210 may select a pixel R01 including a color filter having the same color as the color filter of the pixel R00. The noise extraction unit 220 may extract the noise data of the pixel R00 and the noise data of the pixel R01. The response data output unit 230 may generate each bit of PUF data by comparing the noise data of the pixel R00 and the noise data of the pixel R01. The response data output unit 230 may determine a first bit of the PUF data as 1 when the noise data of the pixel R00 are greater than or equal to the noise data of the pixel R01, and may determine the first bit of the PUF data as 0 when the noise data of the pixel R00 are smaller than the noise data of the pixel R01. When each bit of the PUF data is determined, the response data output unit 230 may output the PUF data as the response data RDATA.

For example, the challenge data CDATA may include information that designates the first row and first column, and first row and third column of the pixel array 410 including the quad pattern. In this case, the pixel R00 disposed at the first row and the first column may be designated and a pixel G02 disposed at the first row and the third column may be designated, in accordance with the challenge data CDATA. When the pixel R00 and the pixel G02 are designated, the PUF pixel selection unit 210 may select the pixel R01 including the color filter having the same color as the color filter of the pixel R00 and a pixel G03 including a color filter having the same color as the color filter of the pixel G02. The noise extraction unit 220 may extract the noise data of the pixel R00 and the noise data of the pixel R01, and may extract the noise data of the pixel G02 and the noise data of the pixel G03. The response data output unit 230 may determine the first bit of the PUF data as 1 when the noise data of the pixel R00 are greater than or equal to the noise data of the pixel R01, and may determine the first bit of the PUF data as 0 when the noise data of the pixel R00 are smaller than the noise data of the pixel R01. Likewise, the response data output unit 230 may determine the second bit of the PUF data as 1 when the noise data of the pixel G02 are greater than or equal to the noise data of the pixel G03, and may determine the second bit of the PUF data as 0 when the noise data of the pixel G02 are smaller than the noise data of the pixel G03. When each bit of the PUF data is determined, the response data output unit 230 may output the PUF data as the response data RDATA.

In an example, the pixel array 410 including the quad pattern may include a first pixel group 411 to a fourth pixel group 414. The pixel group may include a set of pixels with the same color filter, among pixels that are included in the pixel array 410 including the quad pattern, the set of pixels being arrayed in a 2×2 matrix form. Each pixel group may correspond to a unit group of the quad pattern. For example, the first pixel group 411 may include pixels R00, R01, R10, and R11 that are arrayed in the 2×2 matrix form and have an R color filter, among the pixels that are included in the pixel array 410 including the quad pattern. For example, the second pixel group 412 may include pixels G02, G03, G12, and G13 that are arrayed in the 2×2 matrix form and have a G color filter, among the pixels that are included in the pixel array 410 including the quad pattern, and may include.

The locations of the pixels that are included in each of pixel groups (e.g., 411 to 414) may be divided into a first channel to a fourth channel. For example, a location corresponding to the first row and first column of the first pixel group 411 may be defined as the first channel of the first pixel group 411, and the pixel R00 may be defined as being disposed in the first channel of the first pixel group 411. For example, a location corresponding to the first row and second column of the first pixel group 411 may be defined as the second channel of the first pixel group 411, and the pixel R01 may be defined as being disposed in the second channel of the first pixel group 411. For example, a location corresponding to a second row and first column of the first pixel group 411 may be defined as the third channel of the first pixel group 411, and the pixel R10 may be defined as being disposed in the third channel of the first pixel group 411. For example, a location corresponding to the second row and second column of the first pixel group 411 may be defined as the fourth channel of the first pixel group 411, and the pixel R11 may be defined as being disposed in the fourth channel of the first pixel group 411.

In the example, a location corresponding to a first row and first column of the second pixel group 412 may be defined as the first channel of the second pixel group 412, and the pixel G02 may be defined as being disposed in the first channel of the second pixel group 412. For example, a location corresponding to the first row and second column of the second pixel group 412 may be defined as the second channel of the second pixel group 412, and the pixel G03 may be defined as being disposed in the second channel of the second pixel group 412. For example, a location corresponding to a second row and first column of the second pixel group 412 may be defined as the third channel of the second pixel group 412, and the pixel G12 may be defined as being disposed in the third channel of the second pixel group 412. For example, a location corresponding to the second row and second column of the second pixel group 412 may be defined as the fourth channel of the second pixel group 412, and the pixel G13 may be defined as being disposed in the fourth channel of the second pixel group 412. The locations of the first channel to the fourth channel in another pixel group including the third pixel group or the fourth pixel group may be defined similarly to what has been discussed for the first pixel group and the second pixel group.

In an example, the PUF data generation unit 200 may output the response data RDATA by receiving the image data IDATA and the challenge data CDATA. In this case, the challenge data CDATA may include information that designates the location of at least one of the pixels included in the pixel array 410 including the quad pattern. The PUF data generation unit 200 may select a pixel designated based on the challenge data CDATA and a pixel corresponding to the designated pixel through the PUF pixel selection unit 210, may extract the noise values of the designated pixel and the selected pixel through the noise extraction unit 220, and may generate PUF data by comparing the extracted noise values and output the generated PUF data as the response data RDATA through the response data output unit 230.

For example, the challenge data CDATA may include information that designates the first channel of the first pixel group 411. In this case, the pixel R00 disposed in the first channel of the first pixel group 411 may be designated based on the challenge data CDATA. When the pixel R00 is designated, the PUF pixel selection unit 210 may select a pixel R04 that corresponds to the same color filter as the pixel R00 and that is disposed in the same channel as the pixel R00. The noise extraction unit 220 may extract the noise data of the pixel R00 and the noise data of the pixel R04. The response data output unit 230 may generate each bit of PUF data by comparing the noise data of the pixel R00 and the noise data of the pixel R04. The response data output unit 230 may determine the first bit of the PUF data as 1 when the noise data of the pixel R00 is greater than or equal to the noise data of the pixel R04, and may determine the first bit of the PUF data as 0 when the noise data of the pixel R00 is smaller than the noise data of the pixel R04. When each bit of the PUF data is determined, the response data output unit 230 may output the PUF data as the response data RDATA.

For example, the challenge data CDATA may include information that designates the first channel of the first pixel group 411 and information that designates the first channel of the second pixel group 412. In this case, the pixel R00 disposed in the first channel of the first pixel group 411 may be designated and the pixel G02 disposed in the first channel of the second pixel group 412 may be designated, in accordance with the challenge data CDATA. When the pixel R00 and the pixel G02 are designated, the PUF pixel selection unit 210 may select the pixel R04 that corresponds to the same color filter as the pixel R00 and that is disposed in the same channel as the pixel R00, and may select a pixel G06 that corresponds to the same color filter as the pixel G02 and that is disposed in the same channel as the pixel G02. The noise extraction unit 220 may extract the noise data of the pixel R00 and the noise data of the pixel R04, and may extract the noise data of the pixel G02 and the noise data of the pixel G06. The response data output unit 230 may determine the first bit of the PUF data as 1 when the noise data of the pixel R00 are greater than or equal to the noise data of the pixel R04, and may determine the first bit of the PUF data as 0 when the noise data of the pixel R00 are smaller than the noise data of the pixel R04. Likewise, the response data output unit 230 may determine the second bit of the PUF data as 1 when the noise data of the pixel G02 are greater than or equal to the noise data of the pixel G06, and may determine the second bit of the PUF data as 0 when the noise data of the pixel G02 are smaller than the noise data of the pixel G06. When each bit of the PUF data is determined, the response data output unit 230 may output the PUF data as the response data RDATA.

Referring to FIG. 6, the imaging device 10 may generate PUF data in a pixel array 420 including a nona pattern. The nona pattern groups color filters into 3×3 matrices, each pixel group including a set of pixels having the same color filter and being arrayed in a 3×3 matrix form. For example, the pixel array 420 includes a first pixel group 421 corresponding to the red filters, a second pixel group 422 corresponding to the green filters, a third pixel group 423 corresponding to the red filters, a fourth pixel group 424 corresponding to the green filters, each pixel group having pixels arranged in three columns and three rows.

In an example, the PUF data generation unit 200 may output the response data RDATA by receiving the image data IDATA and the challenge data CDATA. In this case, the challenge data CDATA may include information that designates the location of at least one of the pixels included in the pixel array 420 including the nona pattern. The PUF data generation unit 200 may select a pixel designated based on the challenge data CDATA and a pixel corresponding to the designated pixel through the PUF pixel selection unit 210, may extract the noise values of the designated pixel and the selected pixel through the noise extraction unit 220, and may generate PUF data by comparing the extracted noise values and output the generated PUF data as the response data RDATA through the response data output unit 230.

For example, the challenge data CDATA may include information that designates a first row and first column of the pixel array 420 including the nona pattern. In this case, a pixel R00 disposed at the first row and the first column may be designated based on the challenge data CDATA. When the pixel R00 is designated, the PUF pixel selection unit 210 may select a pixel R10 including a color filter having the same color as the color filter of the pixel R00. The noise extraction unit 220 may extract the noise data of the pixel R00 and the noise data of the pixel R10. The response data output unit 230 may generate each bit of PUF data by comparing the noise data of the pixel R00 and the noise data of the pixel R10. The response data output unit 230 may determine the first bit of the PUF data as 1 when the noise data of the pixel R00 are greater than or equal to the noise data of the pixel R10, and may determine the first bit of the PUF data as 0 when the noise data of the pixel R00 are smaller than the noise data of the pixel R10. When each bit of the PUF data is determined, the response data output unit 230 may output the PUF data as the response data RDATA.

For example, the challenge data CDATA may include information that designates the first row and first column and first row and fourth column of the pixel array 420 including the nona pattern. In this case, the pixel R00 disposed at the first row and the first column may be designated and a pixel G03 disposed at the first row and the fourth column may be designated, in accordance with the challenge data CDATA. When the pixel R00 and the pixel G03 are designated, the PUF pixel selection unit 210 may select the pixel R10 including a color filter having the same color as the color filter of the pixel R00 and a pixel G13 including a color filter having the same color as the color filter of the pixel G03. The noise extraction unit 220 may extract the noise data of the pixel R00 and the noise data of the pixel R10, and may extract the noise data of the pixel G03 and the noise data of the pixel G13. The response data output unit 230 may determine a first bit of PUF data as 1 when the noise data of the pixel R00 are greater than or equal to the noise data of the pixel R10, and may determine the first bit of the PUF data as 0 when the noise data of the pixel R00 are smaller than the noise data of the pixel R10. Likewise, the response data output unit 230 may determine the second bit of the PUF data as 1 when the noise data of the pixel G03 are greater than or equal to the noise data of the pixel G13, and may determine the second bit of the PUF data as 0 when the noise data of the pixel G03 are smaller than the noise data of the pixel G13. When each bit of the PUF data is determined, the response data output unit 230 may output the PUF data as the response data RDATA.

In an example, the pixel array 420 including the nona pattern may include a first pixel group 421 to a fourth pixel group 424. The pixel group may include the same color filter, among pixels that are included in the pixel array 420 including the nona pattern, and may be defined as a set of pixels that are arrayed in a 3×3 matrix form. Each pixel group may correspond to a unit group of the nona pattern. For example, the first pixel group 421 may include an R color filter, among the pixels that are included in the pixel array 420 including the nona pattern, and may include pixels R00, R01, R02, R10, R11, R12, R20, R21, and R22 that are arrayed in the 3×3 matrix form. Likewise, the second pixel group 422 may include a G color filter, among the pixels that are included in the pixel array 420 including the nona pattern, and may include pixels G03, G04, G05, G13, G14, G15, G23, G24, and G25 that are arrayed in the 3×3 matrix form.

The locations of pixels included in each of pixel groups (e.g., 421 to 424) may be divided into a first channel to a ninth channel. For example, a location corresponding to the first row and first column of the first pixel group 421 may be defined as the first channel of the first pixel group 421, and the pixel R00 may be defined as being disposed in the first channel of the first pixel group 421. For example, a location corresponding to the first row and second column of the first pixel group 421 may be defined as the second channel of the first pixel group 421, and the pixel R01 may be defined as being disposed in the second channel of the first pixel group 411. For example, a location corresponding to the first row and third column of the first pixel group 421 may be defined as the third channel of the first pixel group 421, and the pixel R02 may be defined as being disposed in the third channel of the first pixel group 421. For example, a location corresponding to the second row and first column of the first pixel group 421 may be defined as the fourth channel of the first pixel group 421, and the pixel R10 may be defined as being disposed in the fourth channel of the first pixel group 421. For example, a location corresponding to a second row and second column of the first pixel group 421 may be defined as the fifth channel of the first pixel group 421, and the pixel R11 may be defined as being disposed in the fifth channel of the first pixel group 421. For example, a location corresponding to the second row and third column of the first pixel group 421 may be defined as the sixth channel of the first pixel group 421, and the pixel R12 may be defined as being disposed in the sixth channel of the first pixel group 421. For example, a location corresponding to a third row and first column of the first pixel group 421 may be defined as the seventh channel of the first pixel group 421, and the pixel R20 may be defined as being disposed in the seventh channel of the first pixel group 421. For example, a location corresponding to the third row and second column of the first pixel group 421 may be defined as the eighth channel of the first pixel group 421, and the pixel R21 may be defined as being disposed in the eighth channel of the first pixel group 421. For example, a location corresponding to the third row and third column of the first pixel group 421 may be defined as the ninth channel of the first pixel group 421, and the pixel R22 may be defined as being disposed in the ninth channel of the first pixel group 421. The locations of the first channel to the ninth channel may be likewise defined even in other pixel groups including the second pixel group 422.

In an example, the PUF data generation unit 200 may output the response data RDATA by receiving the image data IDATA and the challenge data CDATA. In this case, the challenge data CDATA may include information that designates the location of at least one of the pixels included in the pixel array 420 including the nona pattern. The PUF data generation unit 200 may select a pixel designated based on the challenge data CDATA and a pixel corresponding to the designated pixel through the PUF pixel selection unit 210, may extract noise values of the designated pixel and the selected pixel through the noise extraction unit 220, and may generate PUF data by comparing the extracted noise values and output the generated PUF data as the response data RDATA through the response data output unit 230.

For example, the challenge data CDATA may include information that designates the first channel of the first pixel group 421. In this case, the pixel R00 disposed in the first channel of the first pixel group 421 may be designated based on the challenge data CDATA. When the pixel R00 is designated, the PUF pixel selection unit 210 may select the pixel R06 that includes the same color filter as the pixel R00 and that is disposed in the same channel as the pixel R00.

The noise extraction unit 220 may extract the noise data of the pixel R00 and the noise data of the pixel R06. The response data output unit 230 may generate each bit of PUF data by comparing the noise data of the pixel R00 and the noise data of the pixel R06. The response data output unit 230 may determine a first bit of the PUF data as 1 when the noise data of the pixel R00 are greater than or equal to the noise data of the pixel R06, and may determine the first bit of the PUF data as 0 when the noise data of the pixel R00 are smaller than the noise data of the pixel R06. When each bit of the PUF data is determined, the response data output unit 230 may output the PUF data as the response data RDATA.

For example, the challenge data CDATA may include information that designates the first channel of the first pixel group 421 and information that designates the first channel of the second pixel group 422. In this case, the pixel R00 disposed in the first channel of the first pixel group 421 may be designated and the pixel G03 disposed in the first channel of the second pixel group 422 may be designated, in accordance with the challenge data CDATA. When the pixel R00 and the pixel G03 are designated, the PUF pixel selection unit 210 may select the pixel R06 that corresponds to the same color filter as the pixel R00 and that is disposed in the same channel as the pixel R00, and may select the pixel G09 that corresponds to the same color filter as the pixel G03 and that is disposed in the same channel as the pixel G03. The noise extraction unit 220 may extract the noise data of the pixel R00 and the noise data of the pixel R06, and may extract the noise data of the pixel G03 and the noise data of the pixel G09. The response data output unit 230 may determine the first bit of the PUF data as 1 when the noise data of the pixel R00 are greater than or equal to the noise data of the pixel R06, and may determine the first bit of the PUF data as 0 when the noise data of the pixel R00 are smaller than the noise data of the pixel R06. Likewise, the response data output unit 230 may determine the second bit of the PUF data as 1 when the noise data of the pixel G03 are greater than or equal to the noise data of the pixel G09, and may determine the second bit of the PUF data as 0 when the noise data of the pixel G03 are smaller than the noise data of the pixel G09. When each bit of the PUF data is determined, the response data output unit 230 may output the PUF data as the response data RDATA.

For example, the challenge data CDATA may include information that designates the first channel of the first pixel group 421, information that designates the second channel of the first pixel group 421, and information that designates the third channel of the first pixel group 421. In this case, the pixel R00 disposed in the first channel of the first pixel group 421, the pixel R01 disposed in the second channel of the first pixel group 421, and the pixel R02 disposed in the third channel of the first pixel group 421 may be designated in accordance with the challenge data CDATA. When the pixel R00, the pixel R01, and the pixel R02 are designated, the PUF pixel selection unit 210 may select the pixel R06 that corresponds to the same color filter as the pixel R00 and that is disposed in the same channel as the pixel R00, the pixel R07 that corresponds to the same color filter as the pixel R01 and that is disposed in the same channel as the pixel R01, and the pixel R08 that corresponds to the same color filter as the pixel R02 and that is disposed in the same channel as the pixel R02. The noise extraction unit 220 may extract the noise data of the pixel R00 and the noise data of the pixel R06, the noise data of the pixel R01 and the noise data of the pixel G07, and the noise data of the pixel R02 and the noise data of the pixel G08. The response data output unit 230 may determine the first bit of the PUF data as 1 when the noise data of the pixel R00 are greater than or equal to the noise data of the pixel R06, and may determine the first bit of the PUF data as 0 when the noise data of the pixel R00 are smaller than the noise data of the pixel R06. Furthermore, the response data output unit 230 may determine the second bit of the PUF data as 1 when the noise data of the pixel R01 are greater than or equal to the noise data of the pixel R07, and may determine the second bit of the PUF data as 0 when the noise data of the pixel R01 are smaller than the noise data of the pixel R07. Likewise, the response data output unit 230 may determine a third bit of the PUF data as 1 when the noise data of the pixel R02 are greater than or equal to the noise data of the pixel R08, and may determine the third bit of the PUF data as 0 when the noise data of the pixel R02 are smaller than the noise data of the pixel R08. When each bit of the PUF data is determined, the response data output unit 230 may output the PUF data as the response data RDATA.

A method of generating PUF data according to an embodiment of the present disclosure may be applied in a pixel array having another pattern, including a hexa-deca pattern in which pixels including the same color filter, among pixels that are included in a pixel array, are arranged in a 4×4 matrix form.

Figure 7:
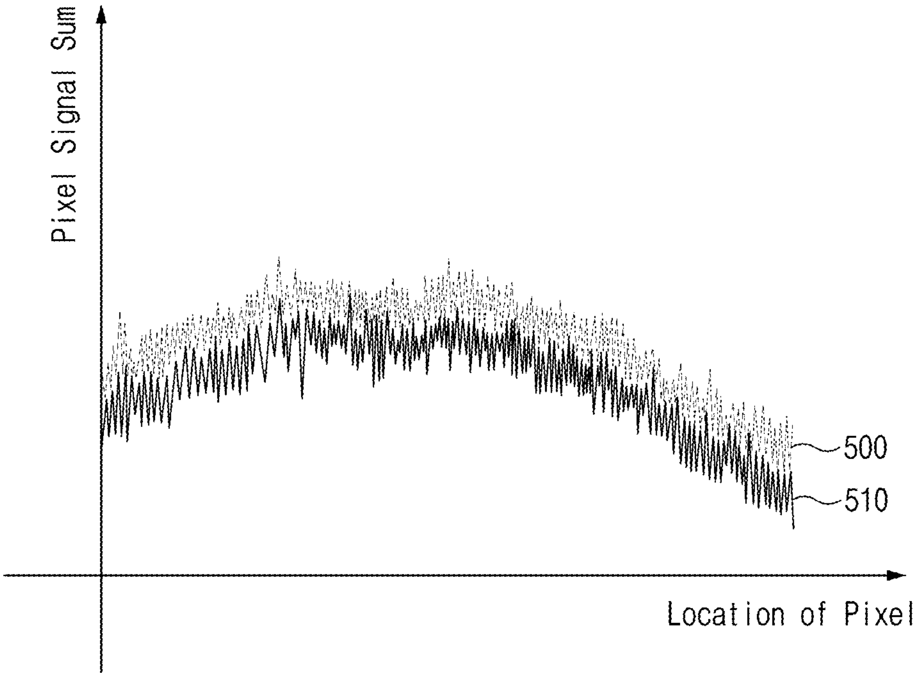
FIG. 7 is a diagram for describing offsets of noise values corresponding to color filters.

FIG. 7 is a diagram for describing offsets of noise values corresponding to color filters.

Referring to FIG. 7, the sum of all signals including noise of a pixel including a blue (B) color filter and the sum of all signals including noise of a pixel including a green (G) color filter may be indicated depending on the locations of the pixels.

In an example, a distribution of pixel data of a pixel including a first color filter may be higher than a distribution of pixel data of a pixel including a second color filter by an offset value. Such characteristics of the distribution is due to various factors, such as a lens characteristic, a crosstalk, or the absorption or reflection of a wavelength of incident light.

For example, a distribution of pixel data of a pixel 500 including a B color filter may be formed to be higher than a distribution of pixel data of a pixel 510 including a G color filter by an offset value. If a first pixel includes a G color filter, when a second pixel that neighbors the first pixel includes a B color filter, the sum of all signals including noise of the first pixel may be lower than the sum of all signals including noise of the second pixel by an offset value. If a third pixel includes a G color filter, when a fourth pixel that neighbors the third pixel includes a B color filter, the sum of all signals including noise of the third pixel may be lower than the sum of all signals including noise of the fourth pixel by an offset value.

In an example, if distributions of pixel data have a difference by an offset value based on a color filter, PUF performance may be degraded because the output of the response data RDATA with respect to the input of the challenge data CDATA can be expected regardless of noise values of pixels.

For example, referring back to FIG. 4, if a pixel G10 is designated in accordance with the challenge data CDATA and the PUF pixel selection unit 210 selects a pixel B11 in accordance with the pixel G10, the pixel data of the pixel G10 may be lower than the pixel data of the pixel B11 by an offset value because the pixel G10 includes a G color filter, the pixel B11 includes a B color filter, and the pixel G10 and the pixel B11 are disposed to neighbor each other. In this case, the response data output unit 230 may generate constant PUF data regardless of the noise value of the pixel G10 and the noise value of the pixel B11, and may output the generated PUF data as the response data RDATA.

For example, the response data output unit 230 may determine a first bit of the PUF data as 1 when the noise data of the pixel G10 is greater than or equal to the noise data of the pixel B11, and may determine the first bit of the PUF data as 0 when the noise data of the pixel G10 is smaller than the noise data of the pixel B11. However, when the pixel data of the pixel G10 is smaller than the pixel data of the pixel B11 by an offset value, the response data output unit 230 may determine the first bit of the PUF data as 0 regardless of at least one piece of RTN, at least one piece of FPN, or a threshold voltage value of a corresponding transistor, which is included in each of the noise data of the pixel G10 and the pixel B11. In this case, the response data RDATA may be expected or obtained because the determined value of the PUF data can be determined as a constant value. For example, the PUF data may be expected as 0 since a noise value of the pixel G10 is expected to be lower than a noise value of the pixel B11 and the response data RDATA may be expected based on the expected PUF data.

In an embodiment of the present disclosure, if the PUF pixel selection unit 210 designates a first pixel based on the challenge data CDATA, the PUF pixel selection unit 210 selects a second pixel including the same color filter as the first pixel, so that an offset effect between the pixel data of the first pixel and the pixel data of the second pixel is removed. Accordingly, the response data output unit 230 may generate PUF data without being affected by the offset effect and output the generated PUF data as the response data RDATA.

In an example, a distribution of pixel data of a pixel disposed in a first channel may be higher than a distribution of pixel data of a pixel disposed in a second channel by an offset value due to various factors such as a lens characteristic, a crosstalk, or the absorption or reflection of a wavelength of incident light.

For example, if a first pixel is disposed in a first channel of a first pixel group and a second pixel corresponding to the first pixel is disposed in a second channel of a second pixel group, the sum of all signals including noise of the first pixel may be lower than the sum of all signals including noise of the second pixel by an offset value.

In an example, if distributions of pixel data based on channels of pixel groups have a difference that amounts to an offset value, PUF performance may be degraded because the output of the response data RDATA with respect to the input of the challenge data CDATA can be expected regardless of noise values of pixels.

For example, referring back to FIG. 5, if the pixel R00 is designated in accordance with the challenge data CDATA and the PUF pixel selection unit 210 selects the pixel R15 in accordance with the pixel R00, the pixel data of the pixel R00 may be lower than the pixel data of the pixel R15 by an offset value because the pixel R00 is disposed in the first channel of the first pixel group 411 and the pixel R15 is disposed in the fourth channel of the third pixel group 413. In this case, the response data output unit 230 may generate the response data RDATA that is constant because the response data output unit 230 determines PUF data regardless of a noise value of the pixel R00 and a noise value of the pixel R15.

For example, the response data output unit 230 may determine a first bit of the PUF data as 1 when the noise data of the pixel R00 are greater than or equal to the noise data of the pixel R15, and may determine the first bit of the PUF data as 0 when the noise data of the pixel R00 are smaller than the noise data of the pixel R15. However, if the pixel data of the pixel R00 are lower than the pixel data of the pixel R15 by an offset value, the response data output unit 230 may determine the first bit of the PUF data as 0 regardless of at least one piece of RTN, at least one piece of FPN, or a threshold voltage value of a corresponding transistor, which is included in each of the noise data of the pixel R00 and the noise data of the pixel R15. In this case, the response data RDATA can be expected because the determined value of the PUF data can be determined as a constant value.

In an embodiment of the present disclosure, if the PUF pixel selection unit 210 designates a first pixel based on the challenge data CDATA, the PUF pixel selection unit 210 may select a second pixel that is disposed in the same channel as the first pixel, so that an offset effect between the pixel data of the first pixel and the pixel data of the second pixel is removed. Accordingly, the response data output unit 230 can generate PUF data without being affected by the offset effect and output the generated PUF data as the response data RDATA.

What is claimed is:

1. An imaging device comprising:

a physical unclonable function (PUF) pixel selection unit configured to identify a first pixel that is designated to generate PUF data and select a second pixel having a color identical to a color of the first pixel;

a noise extraction unit coupled to the PUF pixel selection unit to receive information of the first pixel and the second pixel and configured to extract a first noise value of the first pixel and a second noise value of the second pixel; and a PUF data generation unit coupled to the noise extraction unit and configured to generate the PUF data based on the first noise value and the second noise value from the noise extraction unit.

2. The imaging device of claim 1, wherein the second pixel is disposed distant from a center of the first pixel by at least two pixel-pitches.

3. The imaging device of claim 1, further comprising a first pixel group comprising the first pixel and at least one pixel that neighbors the first pixel and has a color identical to a color of the first pixel.

4. The imaging device of claim 3, wherein:

the first pixel is disposed in a first channel of the first pixel group, and the second pixel is disposed in a first channel of a second pixel group, wherein the first channel indicating a position at a particular row and a particular column of a corresponding pixel group.

5. The imaging device of claim 3, wherein the first pixel group comprises a quad bayer pattern in which pixels comprising a color filter having an identical color are arrayed in a 2×2 array form, a nona pattern in which the pixels are arrayed in a 3×3 array form, or a hexa-deca pattern in which the pixels are arrayed in a 4×4 array form.

6. The imaging device of claim 1, wherein:

the first noise value comprises at least one of fixed pattern noise (FPN) or random telegraph noise (RTN) of the first pixel, and the second noise value comprises at least one of FPN or RTN of the second pixel.

7. The imaging device of claim 6, wherein:

the first noise value comprises a threshold voltage value of at least one transistor corresponding to the first pixel, and the second noise value comprises a threshold voltage value of at least one transistor corresponding to the second pixel.

8. The imaging device of claim 1, wherein the PUF data generation unit is configured to determine a level of a first bit of the PUF data as a first logic level or a second logic level based on a result of a comparison between the first noise value and the second noise value.

9. The imaging device of claim 1, wherein the PUF pixel selection unit is further configured to select a fourth pixel having a color identical to a color of a third pixel that is designated to generate the PUF data.

10. The imaging device of claim 9, wherein the noise extraction unit is configured to extract a third noise value of the third pixel, and extract a fourth noise value of the fourth pixel.

11. The imaging device of claim 10, wherein the PUF data generation unit is configured to determine a level of a second bit of the PUF data as a first logic level or a second logic level based on a result of a comparison between the third noise value and the fourth noise value.

12. The imaging device of claim 10, wherein:

the third noise value comprises at least one of FPN, RTN of the third pixel or a threshold voltage of at least one transistor corresponding to the third pixel, and the fourth noise value comprises at least one of FPN, RTN of the fourth pixel or a threshold voltage of at least one transistor corresponding to the fourth pixel.

13. The imaging device of claim 9, wherein a distance between the third pixel and the fourth pixel is identical to a distance between the first pixel and the second pixel.

14. The imaging device of claim 9, wherein a location of a channel of the third pixel and a location of a channel of the fourth pixel are identical to each other, the channel indicating a position at a particular row and a particular column of a corresponding pixel group.

15. A method of processing an image signal, comprising:

selecting a first pixel in a pixel array of pixels based on challenge data that designates a location of at least one pixel of the pixel array;

selecting a second pixel in the pixel array to have a color identical to a color of the first pixel;

extracting a noise value of each of the first pixel and the second pixel; and generating response data by comparing the noise value of the first pixel and the noise value of the second pixel.

16. The method of claim 15, wherein the second pixel is disposed distant from the first pixel by at least two pixel-pitches.

17. The method of claim 15, wherein the second pixel is disposed in a channel identical to a channel of the first pixel, the channel indicating a position at a particular row and a particular column of a corresponding pixel group.

18. The method of claim 15, further comprising:

selecting a third pixel based on the challenge data; and selecting a fourth pixel having a color identical to a color of the third pixel.

19. The method of claim 15, wherein the extracting of the noise value comprises:

extracting a first noise value based on at least one of fixed pattern noise (FPN) or random telegraph noise (RTN) of the first pixel; and extracting a second noise value based on at least one of FPN or RTN of the second pixel.

20. The method of claim 15, wherein the generating of the response data comprises:

generating first comparison data by comparing the noise value of the first pixel and the noise value of the second pixel; and determining a level of a first bit of the response data as a first logic level or a second logic level based on the first comparison data.

* * * * *